A. C. LAING.
STUMP PULLER.
APPLICATION FILED AUG. 8, 1912.

1,064,497.

Patented June 10, 1913.
5 SHEETS—SHEET 1.

A. C. LAING.
STUMP PULLER.
APPLICATION FILED AUG. 8, 1912.

1,064,497.

Patented June 10, 1913.
5 SHEETS—SHEET 3.

Witnesses

Inventor
Arthur C. Laing
By Mason Fenwick & Lawrence
Attorneys

COLUMBIA PLANOGRAPH CO., WASHINGTON, D. C.

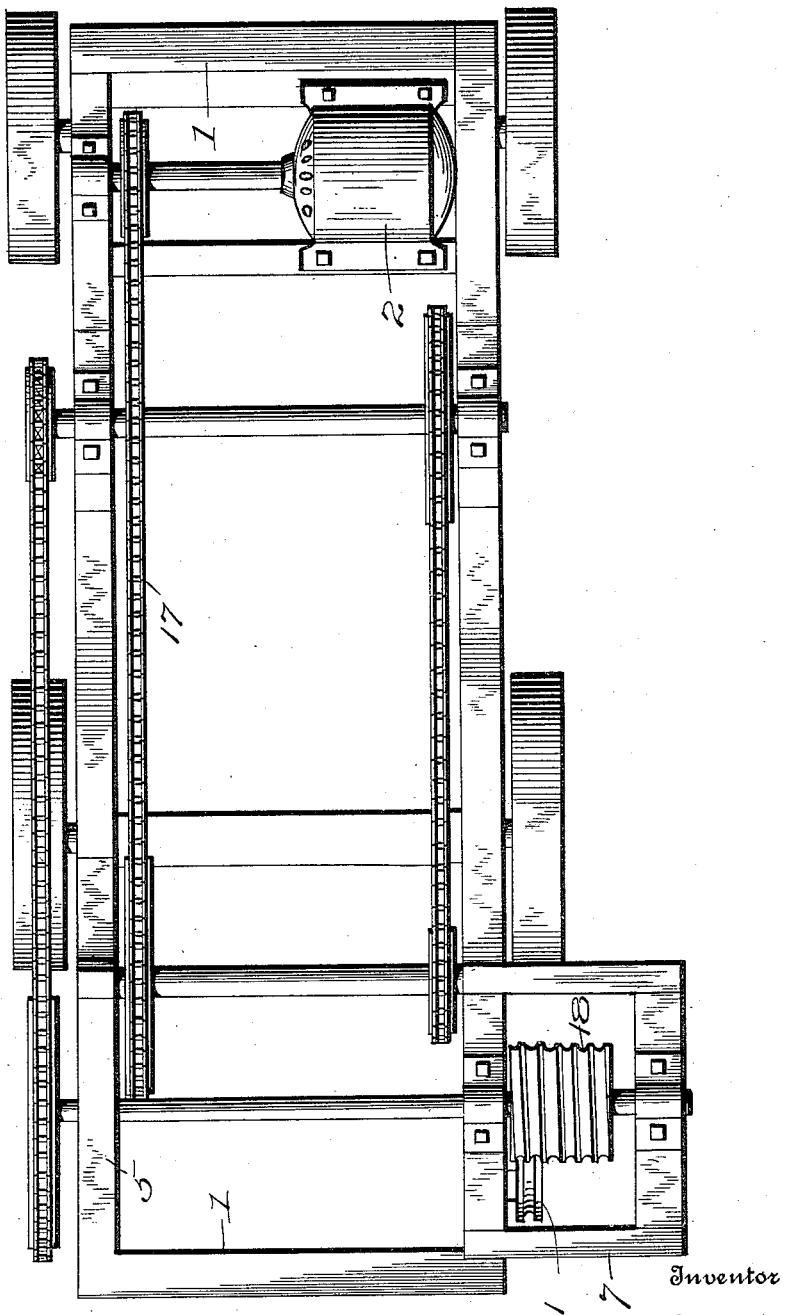

A. C. LAING.
STUMP PULLER.
APPLICATION FILED AUG. 8, 1912.
1,064,497.
Patented June 10, 1913.
5 SHEETS—SHEET 5.
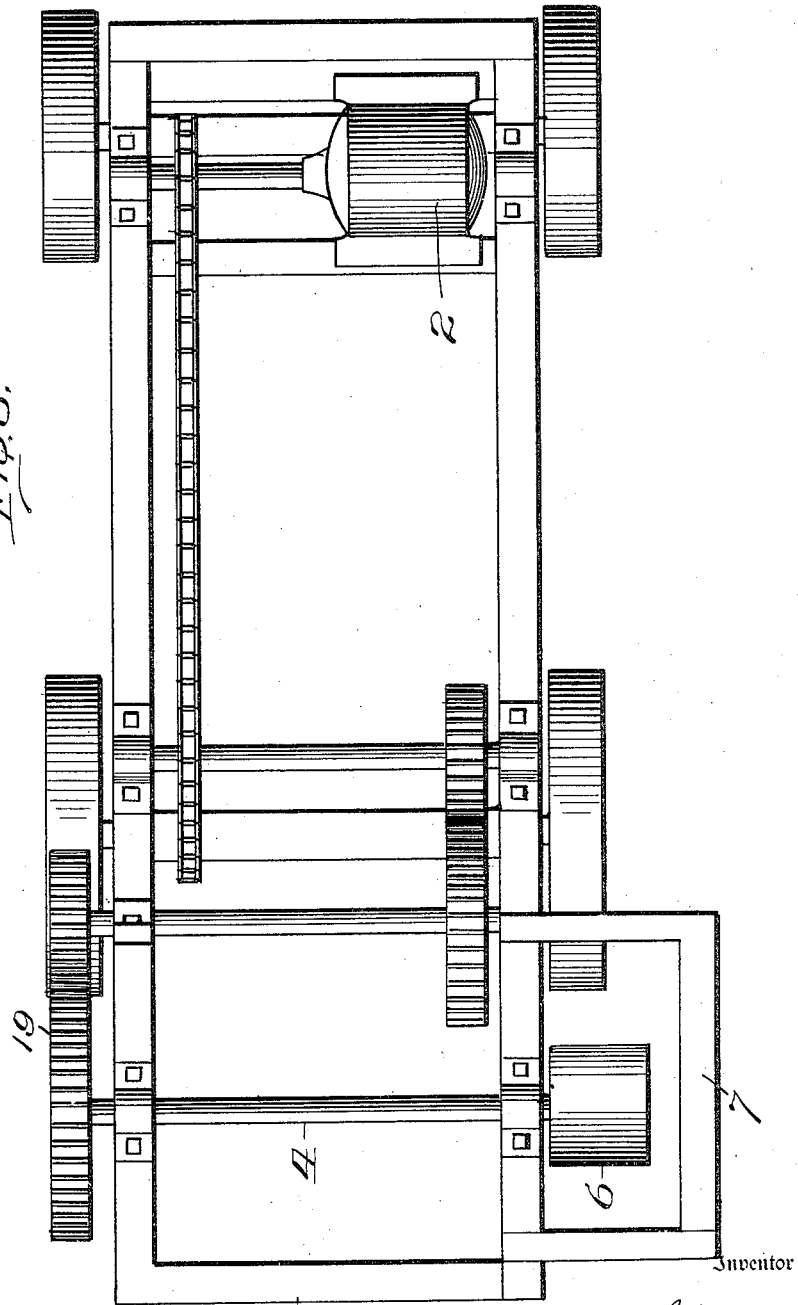

UNITED STATES PATENT OFFICE.

ARTHUR C. LAING, OF DAWSON, GEORGIA.

STUMP-PULLER.

1,064,497.

Specification of Letters Patent.　Patented June 10, 1913.

Application filed August 8, 1912.　Serial No. 714,092.

*To all whom it may concern:*

Be it known that I, ARTHUR C. LAING, a citizen of the United States, residing at Dawson, in the county of Terrell and State of Georgia, have invented certain new and useful Improvements in Stump-Pullers; and I do hereby declare the following to be a full, clear, and exact description of the invention, such as will enable others skilled in the art to which it appertains to make and use the same.

This invention relates to stump pullers and more particularly to means for supporting the strain while the stump is being pulled.

An object of the invention is to provide a frame which can be easily secured to wagon bodies such as are commonly used.

A further object of the invention is to provide means for supporting the strain upon the frame as the stump is being pulled, said means being swung into position during the operation of the machine.

A further object of the invention is to provide a construction whereby the chain or cable used in said machine after being secured to the stump may be wound around the drum several times and trained over a pulley to provide a free end which may be gripped by the operator.

With these and other objects in view the invention comprises certain novel constructions, combinations, and arrangements of parts, as will be hereinafter more fully described and claimed.

Figure 1:
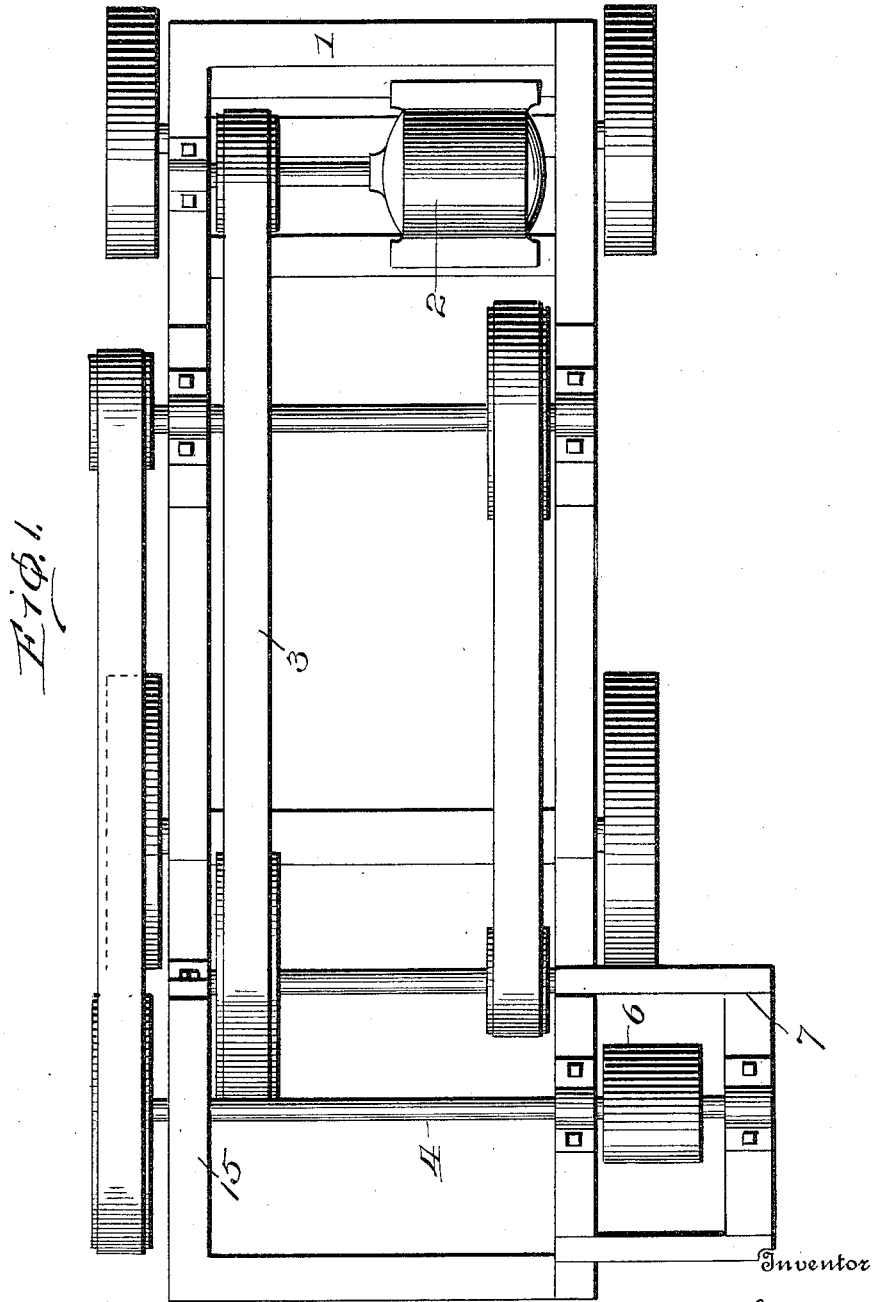
Figure 2:
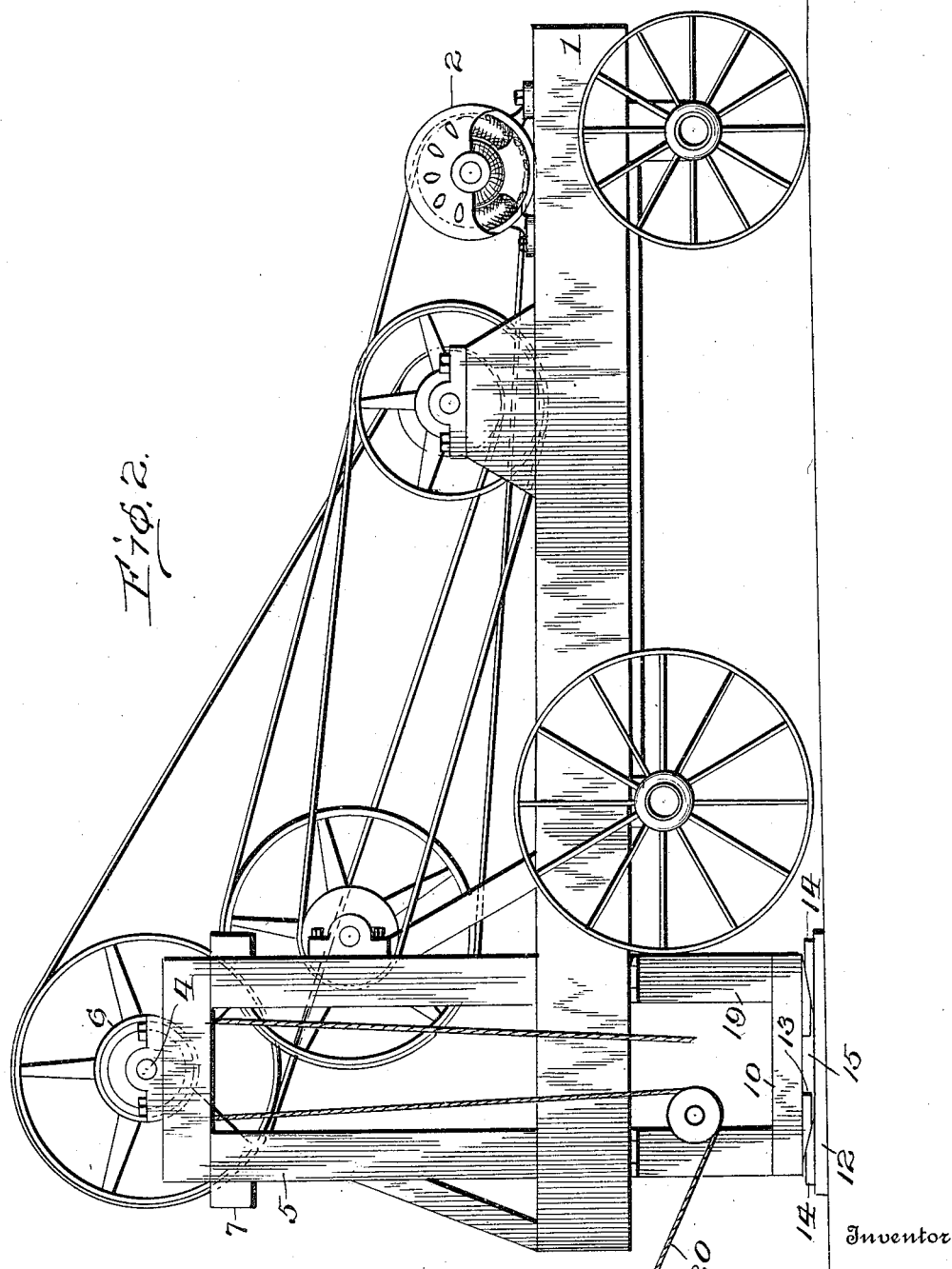
Figure 3:
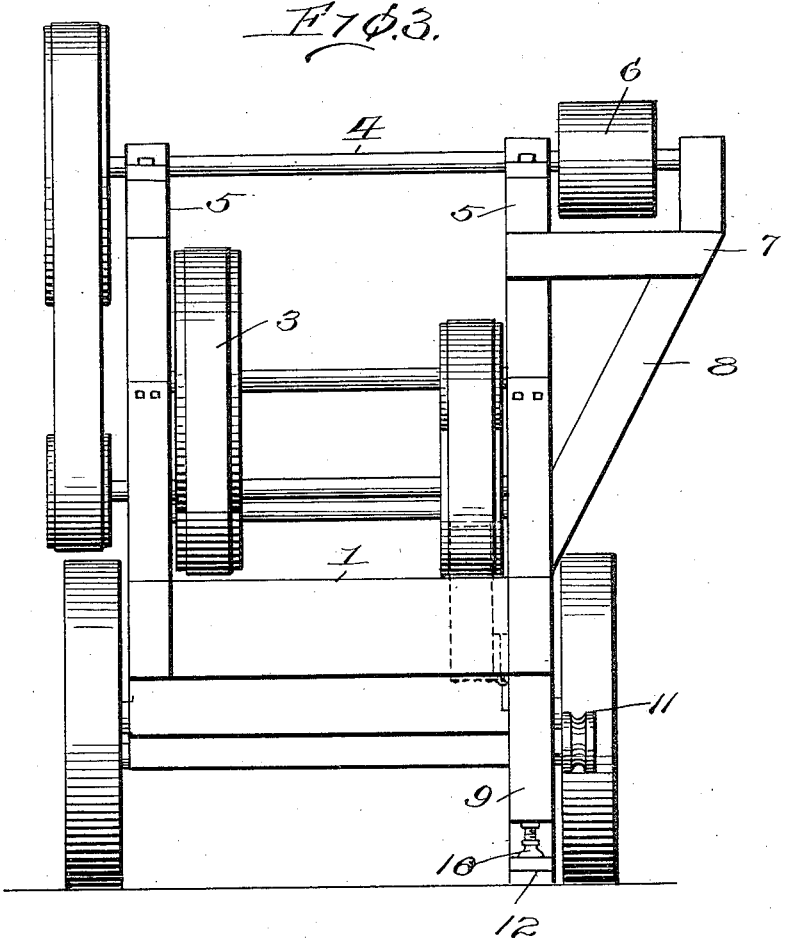

In the drawings: Figure 1 shows a top plan view of the stump puller comprising my invention. Fig. 2 is a side elevation of the stump puller. Fig. 3 is an end elevation showing the invention in detail. Figs. 4 and 5 show modified forms.

Stump pullers heretofore in use have been so constructed that the whole strain of the lifting process has had to be supported by the machine carrying the lifting drum, which has necessitated the use of a very strong supporting frame for the stump puller. Also, the chains or cables which are wound around the drum of the present type are secured to the drum, which causes inconvenience to the operator as the latter endeavors to tie the chain or cable around the stump. By the use of my stump puller, which comprises generally a lifting drum mounted upon a frame, a supporting brace pivoted to the frame, and a pulley journaled to the pivoted brace, I am enabled to provide a stump lifter which can be placed upon any convenient frame.

By referring in detail to the drawings it will be seen that a frame work 1, preferably rectangular in outline is mounted upon any suitable wagon body provided with the usual means for holding the same. While the frame 1 has been shown as separate from the wagon body it is, of course, to be understood that the said frame could be provided with a pair of axles and suitable wheels for carrying the same from place to place. Mounted upon the forward end of the frame 1 is any suitable source of power 2, here indicated as an electric motor, which source of power is connected by means of reducing pulleys and belts 3 to a shaft 4 journaled in uprights 5, secured to the side of sills of frame 1. One end of the shaft 4 projects beyond one of the uprights 5 and carries a drum 6, the outer end of said shaft 4 being journaled in a side frame 7. It is to be understood, of course, that any appropriate form of drum may be used, a cylinder form, as shown in Fig. 1, a grooved form as shown in Fig. 4, or the drum can be concave, the particular form of drum forming no part of this invention. The side frame 7 may be supported by the uprights 5 and the end sills of frame 1 in any suitable way, as by brackets 8. While this particular construction of side frame has been shown, it is to be understood that any form of side frame may be used, the point to be borne in mind being the placing of drum 6 outside of the uprights 5. Hinged to the lower side of frame 1 and designed to swing inwardly of the frame is a supporting brace 9, shown in Fig. 2 as having side posts and a cross bar 10. As shown in dotted lines in Fig. 3, this supporting brace 9 is adapted to swing into the frame and be held there when the stump puller is not in use, thus making the bottom of the frame 1 level for the purpose of storing the same. Journaled upon one of the posts of the brace 9 is a pulley 11, the plane of rotation of said pulley being parallel to the plane of the rotation of drum 6.

Shown in Fig. 4 is a modified form of the invention, the drum 18 in this instance being grooved and being driven by a reducing train of chains and sprockets 17. As shown in Fig. 5, a further modification is indicated, the reducing means being a train of gears, the power being transferred to said gears by sprockets and chains. In this form the frame is indicated as being rigidly attached to the supporting wheels.

In operation the device is carried to the place of operation by any suitable means, and the brace 9 is dropped to take the position shown in Fig. 3. A plank 12 is next placed under cross bar 10 and suitable wedges 13 are placed between said plank 12 and cross bar 10. Other wedges 14 are then forced between the wedges 13 and plank 12, when it will be apparent that the whole frame 1 will be supported by means of the brace 9, the cross bar 10, and the wedges, and plank 12. If the frame be formed rigid with the carrying wheels, the wheels nearest the brace 9 will be lifted from the ground, as indicated at Fig. 2. After the weights of the frame 1 have been transferred to the brace 9, the operator passes one end of the chain or cable 20 around the stump, passes the said chain around drum 6 several times, and then the cable or chain under the pulley 11, the outer end of the cable 20 thus affording a free end to be gripped by the operator. It is to be noted that the pulley 11 is mounted at a point considerably below the shoulders of the operator. When the machine is in readiness for operation the operator will merely pull upon the free end of the cable 20, which will tighten the same upon the drum 6, and the lifting action upon the stump will have commenced. It will be noted, however, that it will be necessary for the operator to pull upon the free end of the chain 20 before the load is transferred to the brace 9. Hence, the necessity of mounting pulley 11 upon the brace 9 in such a way that any strain upon the pulley will not derange the wedges beneath the brace. In so much as the pulley 11 is considerably below the shoulders of the operator it will be possible for the operator to exert considerably more pressure upon the free end of the cable than if no pulley were provided and he gripped the free end after it had passed drum 6. While wedges have been shown it is to be understood that I can use any other suitable means for taking up the play between the brace 9 and the plank 12, such as a jack, indicated in Fig. 3.

From this construction it will be seen that a very simple means is provided for lifting stumps, said means depending in no way upon the strength of the conveying body. Also, the cable has no permanent connection with the frame, this fact enabling the operator to secure the cable to the stump with no inconvenience. Also, it will be apparent that the team hauling the stump puller will drive up to one side of the stump and will not have to back the wagon body in order to place the same centrally of the stump to be pulled. It is to be understood from the description and the showing in Fig. 3 that the brace 9 is swung into the position indicated after a stump has been pulled and carried to the next stump with the machine where it is let down and wedged up for the next operation.

What I claim is:

1. In a stump puller having a frame and a cable removably attached thereto, a bracing member pivoted at one side to the frame, and a pulley journaled to the bracing member on the other side thereof, the said pulley being designed to have the cable passed therearound.

2. In a stump puller, a main frame, a side frame connected to said main frame, a drum supported in said side frame for receiving strain, and a swinging support hinged to the main frame under the side frame for taking the strain.

3. In a stump puller, a main frame, a side frame connected to said main frame, a drum supported in said side frame for receiving strain, a swinging support hinged to the main frame under the side frame for taking the strain, and means for jacking the swinging support under the frame.

4. In a stump puller, a frame, a drum mounted in said frame, a pulley on said frame, a rope adapted to be wound around said drum several turns, one end of said rope connecting with the stump and the other end passing around the pulley and free to be handled, the latter mentioned end being pulled down as the strain is applied to take up slack.

5. In a stump puller, a frame, a drum mounted on said frame, a pulley mounted on said frame, a rope having two free ends, one of said ends engaging a stump, and the other of said ends passing around said pulley and adapted to be handled, a portion of said rope intermediate the ends being wrapped around the drum, and a support for said frame.

6. In a stump puller having a main frame adapted to be carried by a wagon truck, a side frame secured to said main frame, a drum mounted in said side frame, a pulley mounted in said side frame, a rope having two free ends, one of said ends engaging the stump, the other of said ends passing around said pulley and affording a grip, a portion of said rope intermediate the ends being wrapped around the drum and a support for said frame.

7. In a stump puller having a main frame adapted to be carried by a wagon body, a side frame secured to said body, a drum mounted in said side frame, a pulley mounted on said side frame, a rope having two free ends wrapped around said drum, one of said free ends passing around a stump, the other end passing around said pulley and affording a gripping portion, and a supporting frame under said side frame.

In testimony whereof I affix my signature in presence of two witnesses.

ARTHUR C. LAING.

Witnesses:
 M. G. HILL,
 W. B. CHEATHAM.

Copies of this patent may be obtained for five cents each, by addressing the "Commissioner of Patents, Washington, D. C."